United States Patent [19]

Aulik

[11] 4,309,791
[45] Jan. 12, 1982

[54] CASTER BRAKE AND SWIVEL LOCK FOR STRETCHER OR THE LIKE

[75] Inventor: Clarence J. Aulik, Manitowoc, Wis.

[73] Assignee: American Hospital Supply Corporation, Evanston, Ill.

[21] Appl. No.: 106,998

[22] Filed: Dec. 26, 1979

Related U.S. Application Data

[62] Division of Ser. No. 18,979, Mar. 9, 1979.

[51] Int. Cl.³ .............................................. B60B 33/00
[52] U.S. Cl. .................................................... 16/35 R
[58] Field of Search ............................. 16/35 R, 35 D

[56] References Cited

U.S. PATENT DOCUMENTS

| | | | |
|---|---|---|---|
| 690,449 | 1/1902 | Martin | 16/35 D |
| 1,633,638 | 6/1927 | Jarvis | 16/35 R |
| 1,958,494 | 5/1934 | Pehrsson | 16/35 R |
| 2,110,227 | 3/1938 | Koenigkramer | 16/35 D X |
| 2,422,892 | 6/1947 | Forbes et al. | 16/35 D |
| 2,996,310 | 8/1961 | Culver | 280/124 |
| 3,066,947 | 12/1962 | Himmelberger | 280/80 R |
| 3,304,116 | 2/1967 | Stryker | 296/20 |

*Primary Examiner*—Doris L. Troutman
*Attorney, Agent, or Firm*—Donald L. Barbeau; Robert E. Hartenberger

[57] ABSTRACT

An improved system for actuating wheel engaging ring brakes for a hospital stretcher, bed, or the like. The brake includes an elongated rotational member extending longitudinally along the stretcher to actuate pivot arms adjacent one front wheel and one rear wheel to prevent the wheels from rolling. A separate elongated rotational member extends the length of the stretcher and actuates a bullet pin latch to lock a nonbraked wheel against swivel action. Thus, a single nurse can easily push and manipulate the stretcher about a hospital even when loaded with a patient.

10 Claims, 9 Drawing Figures

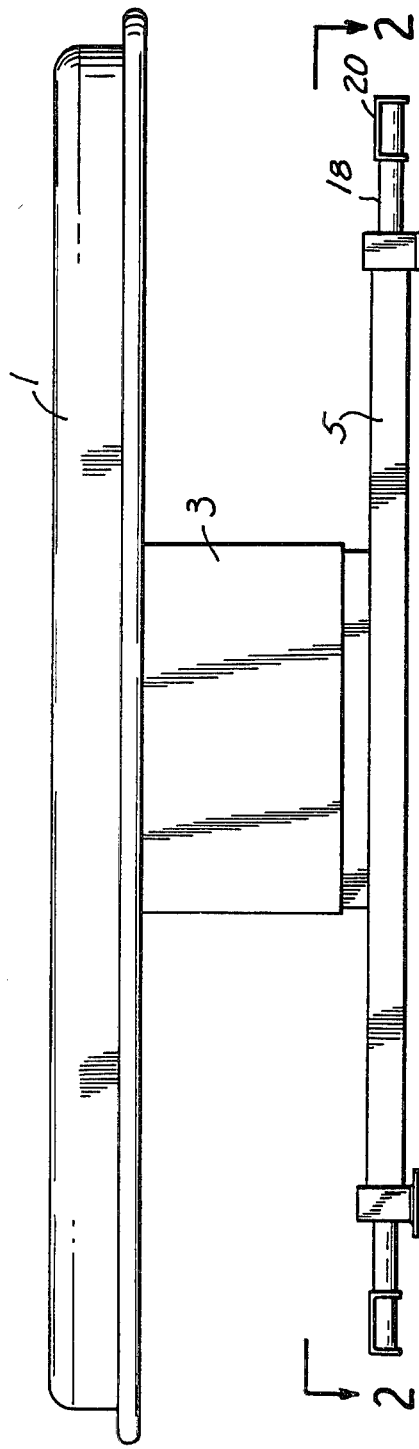
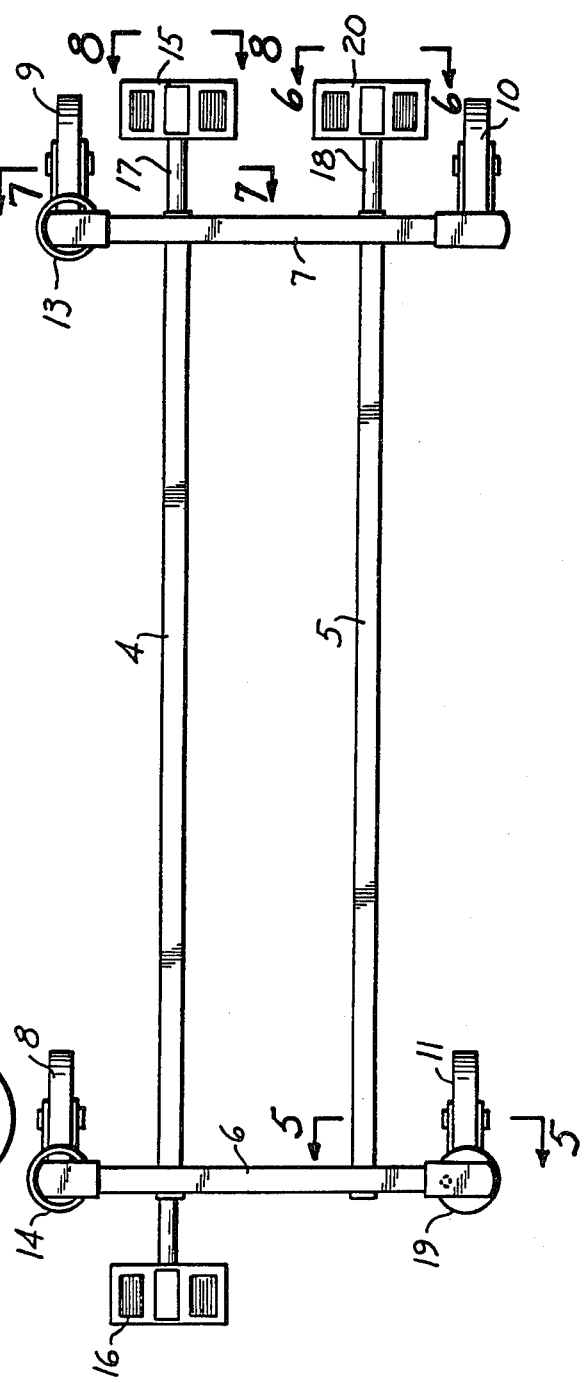

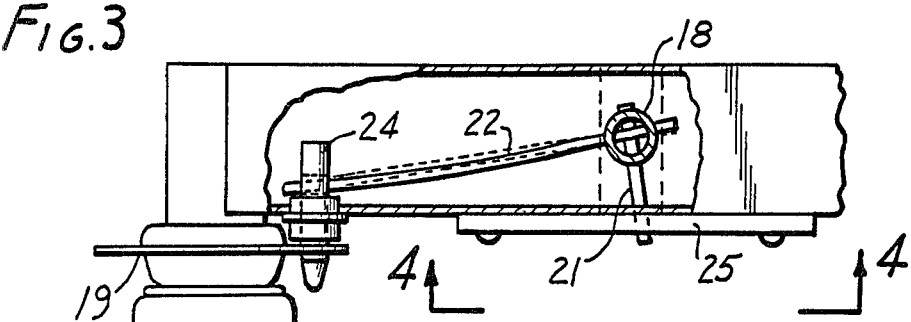
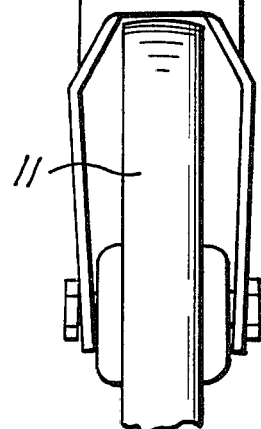
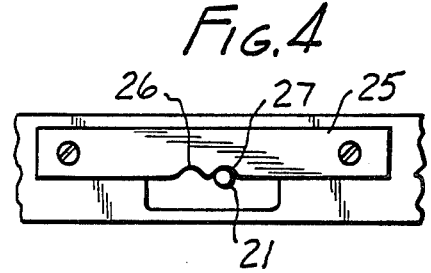
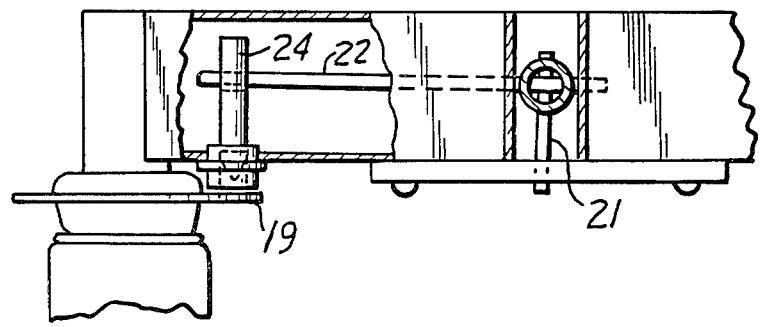
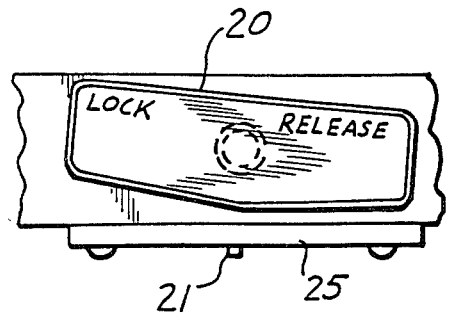

CASTER BRAKE AND SWIVEL LOCK FOR STRETCHER OR THE LIKE

This is a division of application Ser. No. 18,979 filed Mar. 9, 1979.

BACKGROUND

U.S. Pat. No. 2,110,227 described a stretcher with a caster brake system to prevent the stretcher wheels from rolling. This brake system includes a horizontal pipe structure in a rectangular shape with four tire engaging bell-shaped rings at its corners. Cam levers 42 and 43 move the entire rectangular braking structure against the wheels. Because of the long distance; i.e., as much as 5 feet between the front and back casters, any slight longitudinal bend in pipe 38 could cause the bell-shaped rings to fail in engaging the caster wheels. For instance, pipe 38 might be bent when a patient stepped on it to mount the stretcher. Also, the cam levers which are at the side of the stretcher would be difficult for a nurse to get at, particularly when the stretcher was wheeled down a narrow aisle.

Another U.S. Pat. No. 3,304,116 describes a similar system in which all four caster rings are simultaneously urged against the caster wheel by a central longitudinal member which actuates a cam (47 of FIG. 11 ). Here again a bar 36 extends the complete width of the stretcher and any slight bend in this bar could render the brakes ineffective. In this patent, bar 36 is perhaps 2-3 feet long with the cam pressure directly in its center.

In addition to preventing the caster wheels from rolling on the floor, it is also important in certain circumstances to prevent the casters from swiveling. U.S. Pat. No. 1,633,638 describes a spring biased detent system that locks the caster in a particular angular position. However, only a stub lever 17 is provided for actuating the detent system. Thus, a nurse must crawl underneath a stretcher table to lock such caster against swiveling. This caster is not well-suited for a stretcher to which the caster swivel must be frequently locked and unlocked.

SUMMARY OF THE INVENTION

The present invention overcomes the above problems by providing a foot or hand operated rotational brake actuating member that is positioned very closely to two casters. Preferably, this rotational member extends longitudinally along the length of the stretcher between front and rear casters on either the left or right side of the stretcher. A lateral pivot arm joins the rotational member and a wheel lock ring to provide firm control of the braking ring. The pivot arm can be as short as a few inches to minimize longitudinal bending of the pivot arm. A separate rotational member extending along the stretcher actuates a bullet type latch to lock a nonbraked wheel against swivel action.

THE DRAWINGS

FIG. 1 is a side elevational view of a hospital stretcher;

FIG. 2 is a top plan view of the stretcher running gear showing the caster brake and anti-swivel lock systems;

FIG. 3 is a fragmentary end view of the swivel lock device showing one caster in locked position;

FIG. 4 is a fragmentary bottom view taken along line 4—4 of FIG. 3;

FIG. 5 is a view similar to FIG. 3, but showing the swivel lock disengaged;

FIG. 6 is an end view of a foot pedal taken along line 6—6 of FIG. 2;

DETAILED DESCRIPTION

Figure 7:
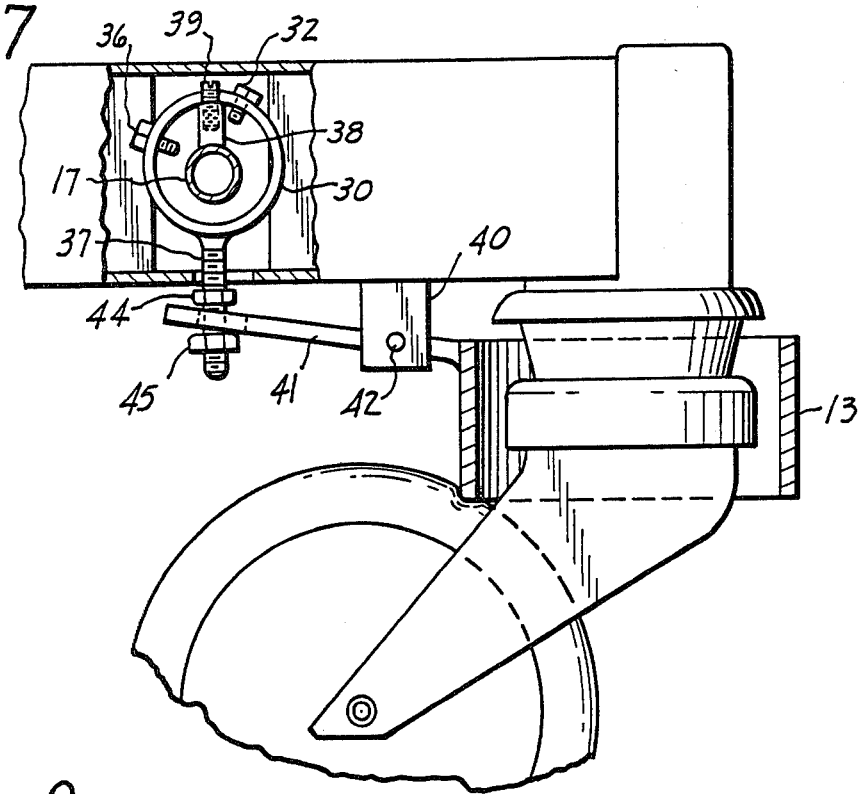
FIG. 7 is an enlarged fragmentary end view taken along line 7—7 of FIG. 2 showing the brake collar engaging the caster wheel.
Figure 9:
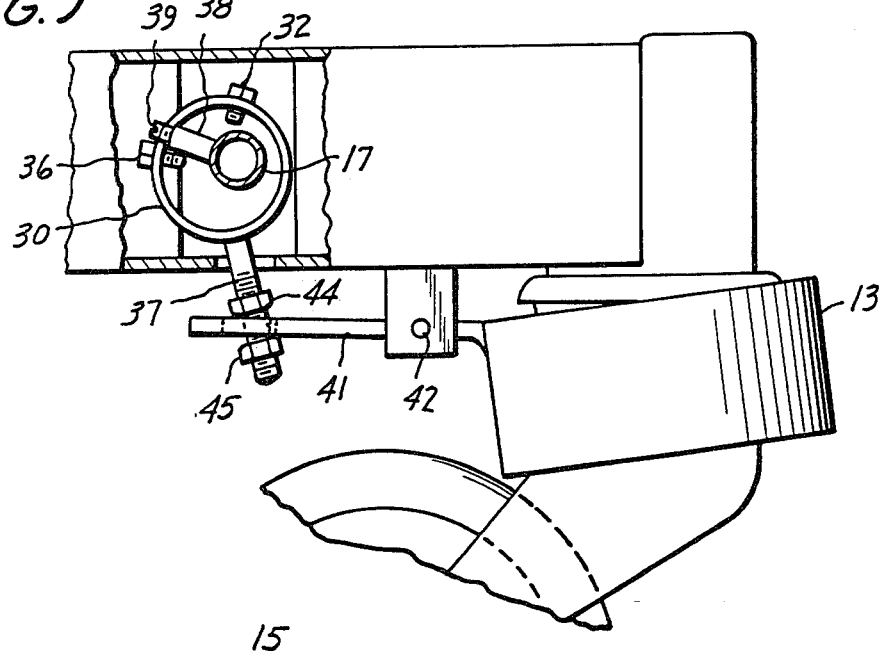
FIG. 9 is a view similar to FIG. 7, but showing the brake collar disengaged from the caster wheel.

FIG. 1 shows a hospital stretcher with a mattress 1 on a mattress support 2 which is attached to a vertical adjusting column 3. Vertical adjusting column 3 is attached to a running gear that includes a pair of longitudinal rectangular channels 4 and 5 which connect to transverse rectangular channels 6 and 7. As seen in FIGS. 1 and 2, four casters, 8, 9, 10, and 11, form a part of the running gear. The casters are conventional and include swivel connections, as well as rolling wheels. Wheel brake collars 13 and 14 are adapted to engage an outer periphery of the wheels of casters 8 and 9. These collars are actuated to a rotational member 17 that extends through the length of rectangular channel 4. Foot pedals 15 and 16 at opposite ends of rotational member 17 actuate the brake collars 13 and 14 through pivot arms (FIGS. 7 and 9).

A rotational member 18 extends longitudinally through rectangular channel 5 and has a mechanism for engaging a latch into a swivel lock plate 19 of caster 11 (FIGS. 3 and 5). A foot pedal 20 actuates the swivel lock mechanism. In a preferred embodiment, no swivel lock mechanism is on caster 10.

The pedals 15 and 20 are at a head end of the stretcher because this is most convenient for a nurse pushing the stretcher along hospital corridors. Pedal 16 at a foot of the stretcher can brake the caster wheels should the nurse be at the foot of the stretcher. In a preferred embodiment, no pedal adjacent caster 11 at the foot of the stretcher is provided.

The anti-swivel mechanism shown in FIG. 3 has rotational member 18 to which is attached retention pin 21 and a flexible spring connector 22. Connector 22 and retention pin 21 are held approximately perpendicular to each other. The spring connector 22 is joined to a bullet type latch 24 that automatically engages a hole in caster swivel lock plate 19 as said hole is positioned under latch 24 as caster 11 swivels in aligned position. This prevents the caster from swiveling. When the bullet latch 24 is engaged as in FIG. 3, connector 22 is flexed from the straight dotted line configuration to the curved solid line configuration to exert a spring pressure on the latch.

Holding the anti-swivel lock in the position shown in FIG. 3 is a resilient bar member 25 of hard rubber, plastic, or thin metal. Resilient bar 25 has a pair of notches 26 and 27 into which retaining pin 21 fits.

As the foot pedal 20 of FIG. 6 is rotated to the right; i.e. release position, the retaining pin 21 of FIG. 5 snaps into notch 26 of the resilient bar member 25. This causes spring connector 22 to withdraw bullet latch 24 from the caster's anti-swivel lock plate 19. Thus, in FIG. 5 the caster is free to swivel. By rotating the pedal of FIG. 6 to the left; i.e. lock position, the anti-swivel lock structure again assumes the position of FIG. 3.

In FIG. 7, the rotational member 17 is shown fitting inside rectangular channel 4. Within each transverse channel 6 and 7 is a cylindrical collar 30 that has stop screws 32 and 36, as well as a threaded member 37. A very simple and very reliable cam action is provided by a rectangular bar member 38 joined to rotational member 17 by a screw with a protruding head 39. A screw with a protruding head, such as 39, is on each end of rectangular bar 38 and positioned to maintain the cylindrical member 30 between two protruding screw heads, such as 39. Thus, a cam is constructed which does not require expensive off center lathe or mill work.

Connected to each cross channel 6 and 7 is a pivot support 40 to which is pivotally connected arm 41. A pivot point 42 is very close to an end of arm 41 that is attached to caster brake ring 43. In FIG. 7, the bar 38 abuts stop 32 when the foot pedal 15 is in locked position, as shown in FIG. 8.

Figure 8:
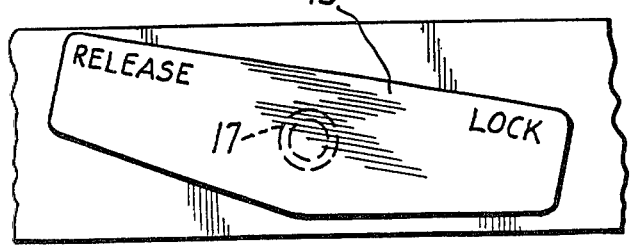
FIG. 8 is an enlarged fragmentary end view of a foot pedal taken along line 8—8 of FIG. 2.

When the foot pedal of FIG. 8 is rotated to the left to its release position, rectangular bar 38 abuts stop 36 and the braking collar 13 lifts from the caster wheel. The amount of tension on the brake at its locked position is controlled by threaded nuts 44 and 45.

With the improved construction described above, a single nurse pushing at a head end or foot end of the stretcher can manipulate pedal 15 or 16 to brake the wheels of casters 8 and 9. Since this will prevent the stretcher from rolling, there is no need to have brakes on all four wheels.

An anti-swivel lock operable through pedal 20 prevents caster wheel 11 from swiveling. This gives great flexibility in manuevering the stretcher. This construction is also usable on hospital beds or the like where manueverability is important.

In the foregoing description, specific examples have been used to describe the invention. However, it is understood that those skilled in the art can make modifications to these examples without departing from the spirit and scope of the invention.

I claim:

1. A stretcher or the like having rotational casters having a swivel locking member for at least one caster, wherein the improvement comprises: a latch movably secured to the stretcher to engage the caster swivel locking member; a rotational member secured to the stretcher and having a longitudinal rotational axis extending in a direction parallel to the direction of movement of said stretcher; a connector member joining to the rotational member and extending transversely from the rotational member's longitudinal axis; said connector being joined to the latch, whereby rotation of the rotational member engages and disengages the latch with the lock structure on the caster.

2. A stretcher or the like as set forth in claim 1, wherein the connector is a spring bar for biasing the latch into engagement with the caster swivel lock structure.

3. A stretcher or the like as set forth in claim 1, wherein the caster swivel lock includes a plate with at least one opening to receive the latch.

4. A stretcher or the like as set forth in claim 1, wherein the latch is of the sliding bullet type.

5. A stretcher or the like as set forth in claim 1, wherein the rotational member extends between a head and foot section of the stretcher.

6. A stretcher or the like as set forth in claim 5, wherein the latch is at one end of the stretcher, and the rotational member has a transverse actuating bar at an opposite end of the stretcher for hand or foot engagement.

7. A stretcher or the like as set forth in claim 6, wherein the caster swivel lock is on one wheel at a foot of the stretcher, and the transverse actuating bar is at a head area of the stretcher.

8. A stretcher or the like as set forth in claim 1, wherein there is a resilient member with notches for holding the rotational member in locked or unlocked positions.

9. A stretcher or the like as set forth in claim 8, wherein there is a retention pin secured to the rotational member to engage the resilient member's notches.

10. A stretcher or the like with four swivel casters, wherein the improvement comprises: a caster brake system for two casters; said brake system includes a first rotational member that actuates brakes for a first and second caster of the four casters; a pair of pivot arms connected to the stretcher and joining the rotational member with braking collars that engage the first and second casters; a second rotational member having a longitudinal axis of rotation extending in a direction parallel to the direction of movement of said stretcher and joined to the stretcher; a connector joined to the second rotational member and extending laterally from its rotational axis; a latch joined to the connector; and a lock on the third caster that is engageable with such latch to lock the third caster from swivel action, whereby at least one caster can be locked against swivel action without being braked against rolling.

* * * * *